Dec. 13, 1938.  J. G. MacCORMACK  2,140,020
OIL FILTER
Filed Sept. 12, 1936  2 Sheets-Sheet 1

INVENTOR.
John G. MacCormack
BY
George D. Richards
ATTORNEY.

Dec. 13, 1938.  J. G. MacCORMACK  2,140,020
OIL FILTER
Filed Sept. 12, 1936  2 Sheets-Sheet 2
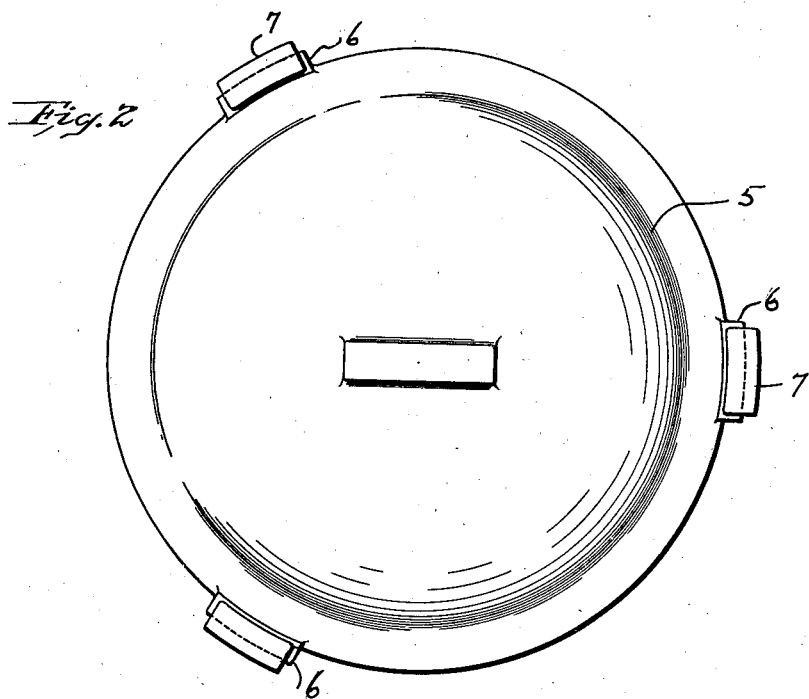
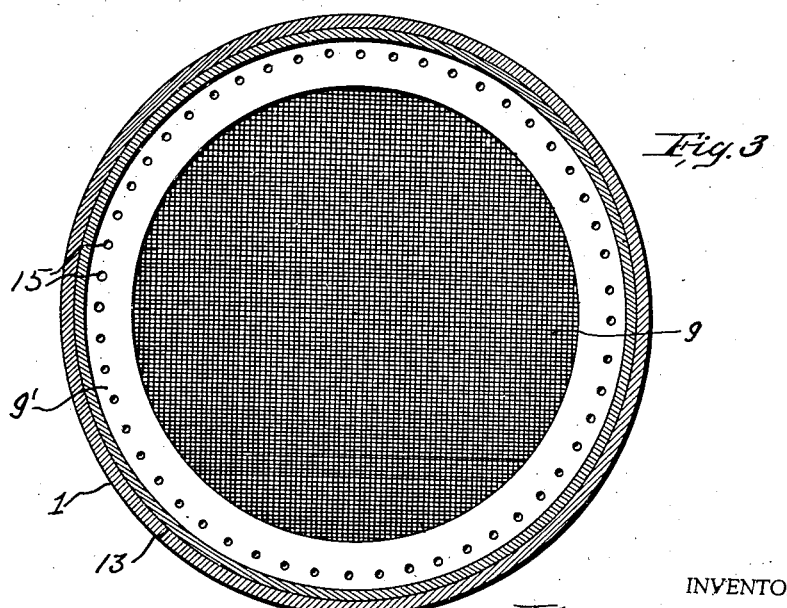
INVENTOR.
John G. MacCormack,
BY
George D. Richards
ATTORNEY.

Patented Dec. 13, 1938

2,140,020

UNITED STATES PATENT OFFICE 2,140,020

OIL FILTER

John G. MacCormack, New York, N. Y.

Application September 12, 1936, Serial No. 100,432

2 Claims. (Cl. 210—165)

This invention relates, generally, to oil filters for Diesel, automotive, marine and stationary engines, the said filter serving to filter and cleanse the crank case oil of such engines.

Oil filters as heretofore constructed, have not been entirely satisfactory because of their tendency to clog up within a short time and hence become useless and also because of their tendency in cold weather, due to the thickening of the oil, to impede the flow of the oil so that the same is caused to by-pass the filter and hence, in effect, the filter becomes useless at the time of starting the engine, which is the very time that an adequate supply of filtered oil should be supplied to the engine to protect the then unlubricated engine surfaces.

The principal object of the present invention is to provide a novel oil filter that is so constructed and arranged as to progressively filter the oil as the latter advances therethrough, thereby facilitating the passage of the oil through the filter and preventing the filter from becoming clogged.

Another object of the present invention lies in the provision of a novel filter of the above character that is provided with consecutive filtering screens of decreasing mesh size whereby larger impurities are first removed and, successively smaller sizes of impurities are successively removed, means being provided for enabling such impurities to pass freely to a suitable sump.

Still another object of the present invention is to provide a novel oil filter of the above character having means for heating the oil therein so that the same will be of the proper viscosity for passage through the filter, the said heater being especially valuable in cold weather, in that the same serves to retain oil at proper viscosity and flowability for reaching the bearing surfaces and cylinder walls of the engine when the engine is cold as during starting.

Still another object of the present invention lies in the provision of the novel filter of the above character having a filtering unit that may readily be removed and replaced as a unit, the said filter having a long life in use.

Other objects of this invention, not at this time more particularly enumerated, will be clearly understood from the following detailed description of the same.

The invention is clearly illustrated in the accompanying drawings, in which:

Fig. 2 is a top plan view of the filter, and

Fig. 3 is a sectional view taken along line 3—3 in Fig. 1, looking in the direction of the arrows.

Similar characters of reference are employed in said views to indicate corresponding parts.

Figure 1:
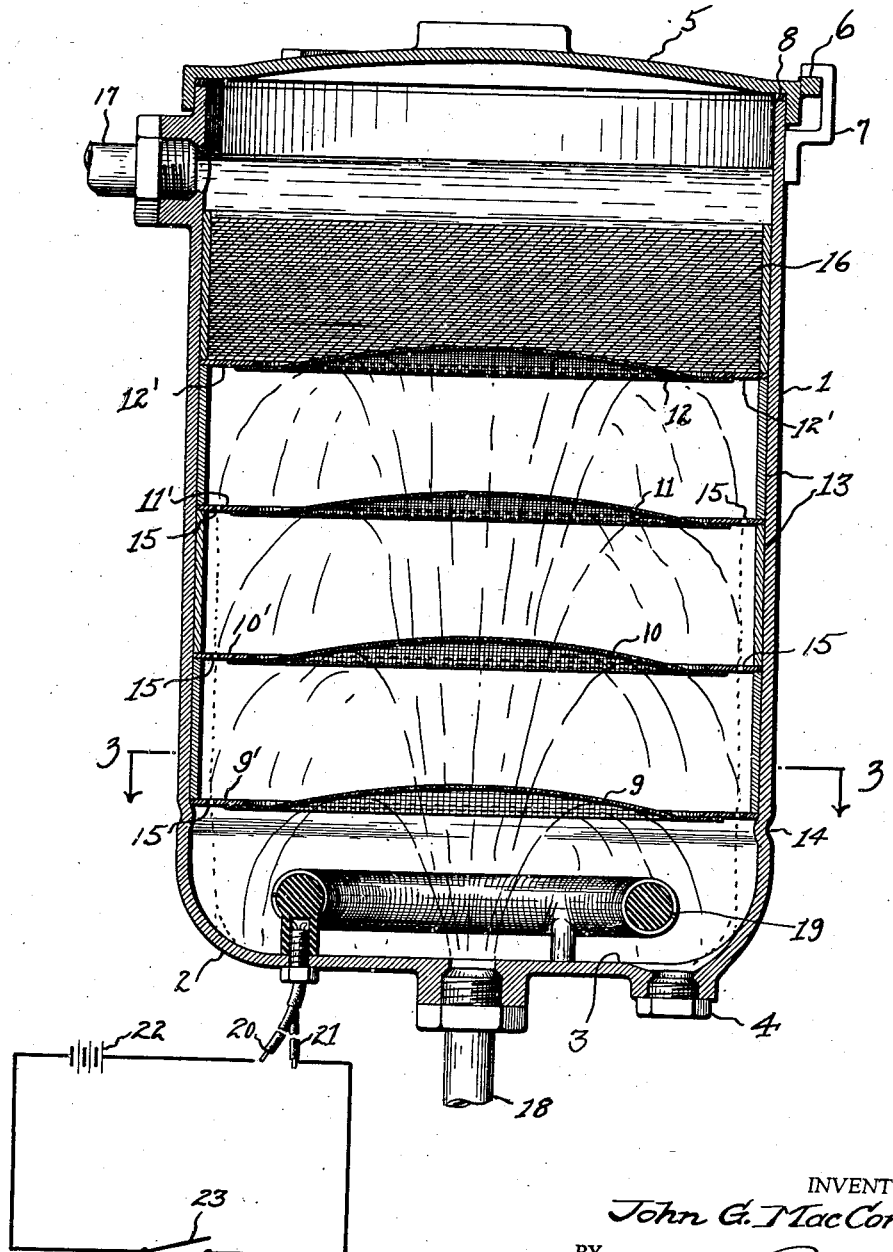
Fig. 1 is a vertical sectional view of the novel filter of this invention.

Referring now to the drawings, the reference numeral 1 designates the filter casing which is illustrated as of substantially cylindrical shape having an integral bottom 2 providing a sump 3 therewithin, the said bottom being also provided with a clean-out plug 4. The cover 5 of the casing 1 is removable and is shown provided at its periphery with helically inclined lugs 6 for cooperating with similarly inclined brackets 7 provided on the upper portion of casing 1. A gasket 8 is shown provided between the cover 5 and the top edge of casing 1.

The filter unit, which is adapted to be removed as a whole from the casing 1, comprises a series of mutually spaced screens 9, 10, 11 and 12 of progressively smaller mesh. Thus, for example, the screen 9, near the bottom of the casing may be of the 80 mesh type, there being 80 meshes to the inch provided in the same, the screen 10 may have 90 meshes to the inch, the screen 11 may have 100 meshes to the inch and the screen 12 may have 100 meshes or more to the inch, thereby providing for progressive filtering of the oil as the same passes upwardly through the casing 1. The under surfaces of the screens 9 to 12 are made concave so that these screens appear to be dome shaped, their highest points being at their centers. The screens 9 to 12 are carried by ring members 9', 10', 11' and 12', respectively, the said screens being attached at their peripheral edges to the ring members mentioned. These ring members in turn are carried by a removable inner cylindrical wall 13 which may consist of successive vertical sections, if desired, the said sections being partially or wholly divided by the ring members.

The casing 1 is shown provided with an annular indentation 14 for supporting the wall 13 and accompanying ring members and screens. The ring members 9', 10' and 11' are provided with an annular series of perforations 15 for allowing the escape of filtered particles therethrough as will further appear. Resting upon the uppermost screen 12 and ring member 12' is a cartridge 16 of suitable filtering material such as fibrous paper, fuller's earth, cotton batting, etc. Above the filter cartridge 16 is provided an outlet pipe 17 leading to the engine crank case.

An oil supply pipe 18 leading from the engine oil pump is connected to the bottom 2 of the casing 1, the said pipe 18 being connected to the bottom 2 at the center thereof and extending vertically for directing oil vertically upwardly into the center of the filter casing. The pressure of the oil pump serves to force the oil with an appreciable velocity upwardly through the center of the casing interior so that such oil impinges upon the central portions of the filters consecutively. Mounted upon the bottom 2 within casing 1 and in surrounding relation to the upwardly flowing oil is an annular electric heater 19. The terminals 20 and 21 of this heater extend downwardly through the bottom 2 for connection to a suitable source of current supply, such as a battery 22 and to a switch 23, the latter being preferably mounted within convenient reach of the engine operator.

In use, in cool weather or when the engine is cold the switch 23 is first closed so that the oil within the filter will be of the proper temperature and hence of suitable viscosity for passing therethrough. Oil supplied from the oil pump through pipe 18 passes upwardly within the hollow interior of casing 1, as shown by the dash lines in Fig. 1 of the drawings. The great mass of this oil passes directly through the coarse mesh of screen 9. However, any large particles of foreign matter such as dirt or carbon which will not pass through screen 9 are directed, due to the velocity of the flowing oil and to the concave nature of the screen 9, towards the sides of the casing 1 and collect in the sump 3, as shown by the dash lines in the drawings.

Since the direction of flow of the oil is upwardly and outwardly, it will be noted that there is a tendency, due to the dome shape of the screen, for particles of foreign matter to flow radially outwardly along the screen and then downwardly into the sump 3. The mass of oil passing the screen 9 moves upwardly onto the screen 10 and the bulk passes therethrough. However, foreign particles that passed the screen 9 but are unable to pass the smaller apertures of screen 10 move radially outwardly along the under surface of the screen 10 and then downwardly towards the sides of the casing 1. Such particles readily pass downwardly through the apertures 15 provided in the ring member 9' and collect in the sump 3. Aperatures 15 of ring 9' are preferably slightly larger than the holes in the mesh of screen 9, thereby enabling the ready passage of these foreign particles downwardly therethrough. The oil passing through screen 10 then moves upwardly to pass through screen 11, and as before any particles which cannot pass through screen 11 are carried radially outwardly by the moving oil and are deposited upon the ring member 10', whereupon the same pass through aperture 15 thereof and corresponding apertures 15 in the ring member 9' for collection in the sump 3. Dotted lines show the passage of the particles to the sump 3 in Fig. 1 of the drawings. Likewise, the oil passing screen 11 passes upwardly through screen 12 and any particles blocked by this latter screen pass downwardly through the apertures 15 in ring members 11', 10' and 9' and into the sump 3. After passing the screen 12 the oil moves upwardly through filter cartridge 16 which serves to remove the last vestige of foreign material. The purified oil then collects above this filter cartridge and passes out through pipe 17 and back to the engine crank case. By unscrewing plug 4 the collected foreign material may be removed.

Inasmuch as the novel filter of this invention provides for progressive filtering of the oil and for the automatic removal of foreign particles, the same has a large capacity and will handle a large flow of oil. Furthermore, owing to the progressive filtering of the oil and the automatic removal of the foreign particles the filter does not become clogged and has exceedingly long life in use. After the filter unit does eventually become clogged, after a long period of use, the filter unit consisting of the successive screens and filter cartridge 16 may readily be removed by taking off cover 5 and then replaced by a fresh unit. The heater 19 is a valuable adjunct, inasmuch as it properly conditions the oil for passage through the filter and thereby enables the engine to receive oil of proper viscosity which is especially desirable when starting.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In a filter of the kind described, a vertical casing having a bottom intake and a top outlet, a series of vertically spaced successively operative mesh screens disposed across the interior of said casing, successive screens being respectively of smaller mesh than the next adjacent preceding screen, said screens being of concavo-convex form having their concave faces downwardly presented whereby filtered particles arrested thereby are deflected toward the sides of said casing as the liquid to be filtered is passed upwardly through the central portions of said screens, and apertured ring members around and between the screen margins and the adjacent casing walls through which said deflected filtered particles may gravitate eventually for collection at the bottom of said casing.

2. In a filter of the kind described, a vertical casing having a bottom intake and a top outlet, a series of vertically spaced successively operative mesh screens disposed across the interior of said casing, successive screens being respectively of smaller mesh than the next adjacent preceding screen, said screens being of concavo-convex form having their concave faces downwardly presented whereby filtered particles arrested thereby are deflected toward the sides of said casing as the liquid to be filtered is passed upwardly through the central portions of said screens, ring members attached to the peripheries of said screens to extend between the latter and said casing walls, means intermediate said ring members to space and support the same and the screens, said ring members having apertures therein to permit gravitational escape of said deflected filtered particles to the bottom of said casing, and a mass of discrete filtering material interposed between the uppermost screen and the casing outlet.

JOHN G. MacCORMACK.